United States Patent
Petz et al.

(10) Patent No.: US 10,731,731 B2
(45) Date of Patent: Aug. 4, 2020

(54) TRANSMISSION DEVICE FOR A MOTOR VEHICLE

(71) Applicant: AUDI AG, Ingolstadt (DE)

(72) Inventors: Andreas Petz, Ingolstadt (DE); Josef Rusch, Grossmehring (DE); Roman Strasser, Gaimersheim (DE)

(73) Assignee: Audi AG, Ingolstadt (DE)

( * ) Notice: Subject to any disclaimer, the term of this patent is extended or adjusted under 35 U.S.C. 154(b) by 890 days.

(21) Appl. No.: 15/248,891

(22) Filed: Aug. 26, 2016

(65) Prior Publication Data

US 2017/0059004 A1  Mar. 2, 2017

(30) Foreign Application Priority Data

Aug. 29, 2015  (DE) .................. 10 2015 011 405

(51) Int. Cl.

| | | |
|---|---|---|
| *F16D 21/06* | (2006.01) | |
| *F16H 3/00* | (2006.01) | |
| *F16D 23/12* | (2006.01) | |
| *F16H 3/093* | (2006.01) | |
| *F16H 3/08* | (2006.01) | |

(52) U.S. Cl.
CPC ............. *F16H 3/006* (2013.01); *F16D 21/06* (2013.01); *F16D 23/12* (2013.01); *F16D 2021/0638* (2013.01); *F16D 2021/0676* (2013.01); *F16D 2023/123* (2013.01); *F16H 2003/0818* (2013.01); *F16H 2003/0931* (2013.01); *F16H 2200/0052* (2013.01)

(58) Field of Classification Search
CPC ............. F16H 3/006; F16H 2003/0931; F16H 2200/0052; F16H 2003/0818; F16D 13/54; F16D 21/06; F16D 23/12; F16D 27/112; F16D 27/115
USPC .......... 74/331, 337.5; 192/93 R, 93 A, 93 B, 192/85.48, 85.49
See application file for complete search history.

(56) References Cited

U.S. PATENT DOCUMENTS

| | | | | |
|---|---|---|---|---|
| 2,043,784 A | * | 6/1936 | Brooks | ................... F16D 21/04 192/48.8 |
| 2,052,430 A | * | 8/1936 | Brooks | ................... F16D 13/54 192/114 R |
| 2,376,136 A | * | 5/1945 | Gerst | ..................... F16D 13/54 192/110 B |

(Continued)

FOREIGN PATENT DOCUMENTS

| | | |
|---|---|---|
| CN | 103052823 | 4/2013 |
| DE | 39 28 816 A1 | 3/1991 |

(Continued)

OTHER PUBLICATIONS

Chinese Search Report dated Dec. 7, 2017 with respect to counterpart Chinese patent application 201610729722.X.

(Continued)

*Primary Examiner* — William C Joyce
(74) *Attorney, Agent, or Firm* — Henry M. Feiereisen LLC

(57) ABSTRACT

A transmission device for a motor vehicle includes a multi-speed transmission; a multidisc clutch assigned to the multi-speed transmission for changing gears of the multi-speed transmission, and an actuating device for actuating the multidisc clutch, wherein the actuating device has a wedge mechanism which is operatively connected with the multi-disc clutch for actuating the multidisc clutch.

5 Claims, 1 Drawing Sheet

(56) References Cited

U.S. PATENT DOCUMENTS

| | | | | |
|---|---|---|---|---|
| 2,376,799 | A * | 5/1945 | Miller | F16D 13/54 |
| | | | | 192/111.6 |
| 3,175,411 | A * | 3/1965 | McFarland | F16H 3/089 |
| | | | | 192/93 R |
| 3,703,226 | A * | 11/1972 | Strehler | F16D 13/04 |
| | | | | 192/48.91 |
| 4,817,772 | A | 4/1989 | Sacher | |
| 4,878,571 | A * | 11/1989 | Sacher | F16D 13/04 |
| | | | | 192/48.91 |
| 5,078,249 | A * | 1/1992 | Botterill | F16H 3/089 |
| | | | | 192/93 A |
| 5,230,255 | A * | 7/1993 | Botterill | F16D 23/12 |
| | | | | 192/93 A |
| 5,435,201 | A * | 7/1995 | Preston | F16D 27/115 |
| | | | | 192/84.93 |
| 5,485,904 | A * | 1/1996 | Organek | F16D 23/12 |
| | | | | 192/35 |
| 5,802,915 | A | 9/1998 | Organek et al. | |
| 6,571,654 | B2 | 6/2003 | Forsyth | |
| 8,850,911 | B2 * | 10/2014 | Jurjanz | F16D 23/12 |
| | | | | 192/54.52 |
| 9,033,126 | B2 * | 5/2015 | Strong | F16D 21/00 |
| | | | | 192/48.91 |
| 2004/0198548 | A1 | 10/2004 | Showalter et al. | |

FOREIGN PATENT DOCUMENTS

| | | |
|---|---|---|
| DE | 697 07 058 T2 | 6/2002 |
| GB | 881724 | 11/1961 |
| JP | S50272 | 1/1975 |

OTHER PUBLICATIONS

Translation of Chinese Search Report dated Dec. 7, 2017 with respect to counterpart Chinese patent application 201610729722.X.

* cited by examiner

TRANSMISSION DEVICE FOR A MOTOR VEHICLE

CROSS-REFERENCES TO RELATED APPLICATIONS

This application claims the priority of German Patent Application, Serial No. 10 2015 011 405.0, filed Aug. 29, 2015, pursuant to 35 U.S.C. 119(a)-(d), the content of which is incorporated herein by reference in its entirety as if fully set forth herein.

BACKGROUND OF THE INVENTION

The invention relates to a transmission device for a motor vehicle.

The following discussion of related art is provided to assist the reader in understanding the advantages of the invention, and is not to be construed as an admission that this related art is prior art to this invention.

In multi-speed transmissions a change between the multiple gears of the transmission can be accomplished for example by a multidisc clutch. The multidisc clutch can be actuated by an actuator. The actuator operates for example hydraulically and as a result a hydraulic pressure is required for changing a gear. In order to change the gear within a shortest possible time period the hydraulic pressure usually has to be provided permanently, which in turn results in a relatively high energy consumption.

It is therefore an object of the invention to provide an improved transmission device for a motor vehicle, which in particular has a lower energy consumption.

SUMMARY OF THE INVENTION

According to one aspect of the invention, a transmission device for a motor vehicle, comprising: a multi-speed transmission; a multidisc clutch assigned to the multi-speed transmission for changing gears of the multi-speed transmission; and an actuating device for actuating the multidisc clutch, said actuating device having a wedge mechanism which is operatively connected with the multidisc clutch for actuating the multidisc clutch. The force required for actuating the multidisc clutch is thus generated purely mechanically or purely electromagnetically so that the provision of a hydraulic fluid for actuating the multidisc clutch is not required.

The term wedge mechanism means a mechanical device in which at least one element is in contact with a second element so that the two elements slidingly run off of each other or can run off of each other. At least one of the two elements is configured wedge shaped so that it deflects the respectively other element to a different degree in dependence of the position of the two elements relative to each other. For example the second element is operatively connected with the multidisc clutch.

According to another advantageous feature of the invention, at a first position of the two elements relative to each other the second element is deflected so that the multidisc clutch is open, while in a second position of the two elements relative to each other the second element is arranged so that the clutch is closed, in particular completely. With such a configuration of the transmission device energy is only required when changing gears. The permanent provision of support energy for example in the form of hydraulic pressure is therefore not required. This is in particular the case when the wedge mechanism is stable in the first relative position and/or the second relative position, it can only be displaced out of the first and/or second relative position by exerting energy. Particularly preferably the wedge mechanism is also configured so that a force exerted by the multidisc clutch on the wedge mechanism does not cause a displacement of the elements relative to each other, at least not during normal operation.

According to another advantageous feature of the invention, the multi-speed transmission is constructed as an automatic transmission, wherein the multidisc clutch is adapted to establish a direct operative connection between the first and the second shaft of the multi-speed transmission and/or between the first shaft and a transmission housing of the multi-speed transmission. The wedge mechanism is particularly advantageous when combined with a multi-speed transmission, which enables a gear change without interruption of traction. This is the case for the automatic transmission. The term automatic transmission means for example a converter transmission which has a torque converter and at least one planetary gear set.

By means of the multidisc a direct coupling between the first shaft and the second shaft can be selectively generated or interrupted. For example when an operative connection between the two shafts is established a first gear is established and when the operative connection is interrupted a second gear or a second transmission ratio is established. In addition or as an alternative the multidisc clutch can serve for generating an operative connection between the first shaft and the transmission housing. By means of the multidisc clutch the first shaft can either be released or, at least partially, in particular completely, be fixed relative to the transmission housing. When the first shaft is released for example the first gear or the first transmission ratio is established, while when the first shaft is fixed the second gear or the second transmission ratio is established.

According to another advantageous feature of the invention, the multi-speed transmission is constructed as a multiple clutch transmission, wherein the multidisc clutch is adapted to establish a direct operative connection between an input shaft and an intermediate shaft of the multi-speed transmission. The multiple clutch transmission is for example a dual clutch transmission. The multi-speed transmission has the input shaft and multiple intermediate shafts. Each of the intermediate shafts is assigned different gears. For example, a first one of the intermediate shafts is assigned multiple gears and a second one of the intermediate shafts is assigned further but different gears. By generating the operative connection between the input shaft on one hand and one of the intermediate shafts on the other hand the gears to be engaged can be selected.

By correspondingly adjusting the multiple clutch transmission gears can be changed without interruption of traction. For example the input shaft is operatively connected with a first one of the intermediate shafts via the multidisc clutch. On the second one of the intermediate shafts only the gear to be engaged is set and the gear change is executed by releasing the operative connection between the input shaft and the first intermediate shaft while simultaneously, or at least substantially simultaneously establishing the operative connection between the input shaft and the second intermediate shaft. The multidisc clutch is hereby situated between the input shaft and the intermediate shafts.

According to another advantageous feature of the invention, the multidisc clutch is a component of a multi-clutch which has a further multidisc clutch, which can also be actuated by means of the actuator. This can in particular be realized in the embodiment of the multi-speed transmission as dual clutch transmission. In this case the operative connection between the input shaft and the first intermediate shaft and the operative connection between the input shaft and the second intermediate shaft can be generated by means of the further multidisc clutch. The actuator serves for actuating the multidisc clutch as well as the further multidisc clutch. For this purpose the actuator has for example multiple of the aforementioned second elements, wherein a first one of the second elements is operatively connected with the multidisc clutch and a second one of the second elements is operatively connected with the further multidisc clutch.

The actuating device is hereby preferably configured so that in a first position of the first element and the two second elements relative to each other the first one of the second elements is arranged so that the multidisc clutch is completely open, while the second one of the second elements is arranged for the complete closing of the further multidisc clutch or vice versa. In the second position of the first element and the second elements relative to each other on the other hand the first one of the second elements is arranged so that the multidisc clutch is completely closed, while the second one of the second elements is arranged for complete opening of the further multidisc clutch.

According to another advantageous feature of the invention, the further multidisc clutch is adapted to establish a direct operative connection between the first shaft and a further second shaft of the multi-speed transmission and/or between the second shaft and the transmission housing. The further second shaft is different from the second shaft described above. Thus while the direct operative connection between the first shaft and the second shaft can be generated by the multidisc clutch, such an operative connected is to be generated between the first shaft and the further shaft by the further multidisc clutch. In addition or as an alternative the second shaft can be selectively fixed or released relative to the transmission housing by means of the further multidisc clutch. Such a configuration is in particular provided so that the multi-speed transmission is constructed as an automatic transmission.

According to another advantageous feature of the invention, the further multidisc clutch is adapted to establish a direct operative connection between the input shaft and a further intermediate shaft of the multi-speed transmission. The further intermediate shaft is preferably a component of the multiple clutch transmission, in particular of the dual clutch transmission. Assigned to the intermediate shaft and the second intermediate shaft are respective gears of the multi-speed transmission so that a fast switching between the gears can be performed.

According to another advantageous feature of the invention, the wedge mechanism has a displaceable, switching element and an actuating element that is operatively connected with the multidisc clutch, wherein the switching element and/or the setting element has/have at least one adjusting ramp. Using the terminology above the first element forms the displaceable switching element and the second element the setting element, the switching element is displaceable relative to the setting element, for example it is supported for rotation relative to the setting element about a rotation axis. The setting element is also displaceable, however, preferably only in axial direction relative to the rotation axis.

Either the switching element, the setting element or both have an adjusting ramp. The adjusting ramp or the adjusting ramps are configured so that in a first position of the switching element and setting element relative to each other, in particular in a first rotary angular position of the switching element, the setting element is present in a first position, in particular a first axial position, or is urged into this position. Further, the adjusting ramp or the adjusting ramps are configured so that in a second position of switching element and the setting element relative to each other, in particular a second rotary angular position of the switching element, the setting element is present or is urged into a second position, in particular a second axial position.

According to another advantageous feature of the invention, a further setting element is present on the side of the switching element which is opposite the setting element, wherein the further setting element is operatively connected with the further multidisc clutch, wherein the switching element and/or the further setting element have at least one further adjusting ramp. With regard to the rotation axis described above the further setting element is thus situated on the side of the switching element that faces away from the setting element.

The adjusting ramp and/or the further adjusting ramp can be a component of a ball ramp mechanism. By means of the ball ramp mechanism only a rolling friction is present in case of a movement of the switching element relative to the setting element or the setting elements so that compared to a configuration with multiple adjusting ramps in which sliding friction occurs the friction between the switching element and the setting element or the setting elements can be significantly reduced. Correspondingly the energy consumption is significantly reduced.

According to another advantageous feature of the invention, the ball ramp mechanism has at least one ball, which rests against the adjusting ramp or the further adjusting ramp. The ball is situated between the switching element and the setting element or between the switching element and the further setting element. The ball hereby permanently contacts the switching element and the setting element or the further setting element. As a result of the movement of the switching element relative to the setting element the ball runs either up on the adjusting ramp or down from the adjusting ramp so that it either urges the setting element away from the switching element or enables displacement of the setting element in the direction of the switching element. Preferably the setting element and/or the further setting element are impinged with a spring force which urges the setting element or the further setting element in the direction of the switching element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
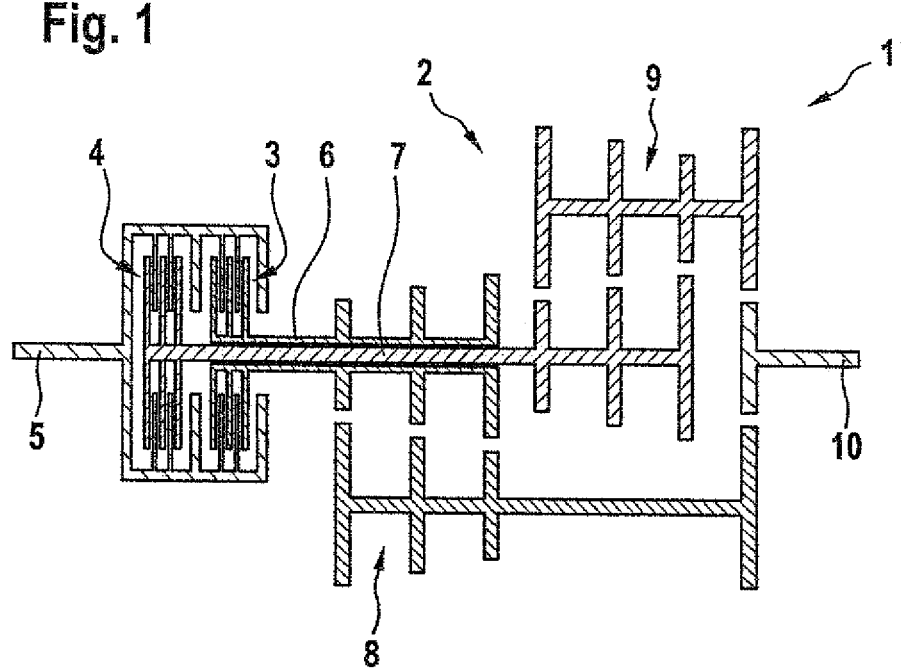
FIG. 1 shows a schematic representation of a transmission device for a motor vehicle.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a schematic representation of a transmission device 1. The transmission device has a multi-speed transmission 2, which in the here shown embodiment is constructed as a dual clutch transmission. Assigned to the multi-speed transmission 2 are, for changing gears, a multidisc clutch 3 and a further multidisc clutch 4. By means of the multidisc clutch 3 an operatively connection between an input shaft 5 of the multi-speed transmission 2 and an intermediate shaft 6 can be selectively created. Analogously, an operative connection between the input shaft 5 and a further input shaft 7 can be selectively established or interrupted. The intermediate shaft 6 and also the intermediate shaft 7 is respectively operatively connected with an output shaft 10 of the multi-speed transmission 2 via a gearwheel set 8 or 9. The multidisc clutch 3 and also the multidisc clutch 4 can be actuated by a here not further shown actuator 11.

Figure 2:
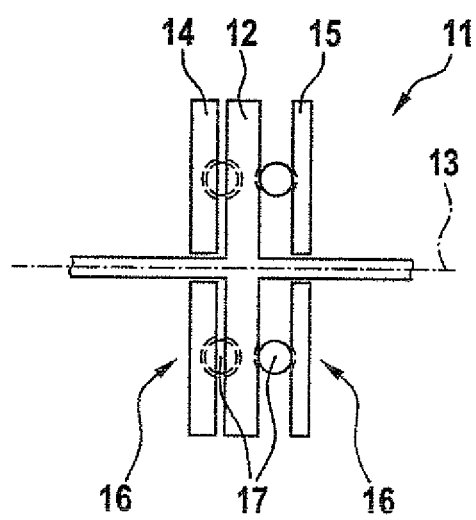
FIG. 2 shows a schematic representation of an actuating device for a multi-speed transmission of the transmission device.

FIG. 2 shows a schematic representation of the actuator 11. The actuating device has a wedge mechanism for actuating the multidisc clutch 3 or 4. Concretely it is provided that the actuator 11 has a displaceable switching element 12, which is rotatably supported relative to a rotation axis 13. Further a setting element 14 and a further setting element 15 are provided which are displaceable in axial direction relative to the switching element 12 relative to the rotation axis 13. The setting element 14 is operatively connected with the multidisc clutch 3 and the setting element 15 with the multidisc clutch 4.

Between the switching element 12 and the setting element 14 as well as between the switching element 12 and the setting element 15 a respective ball ramp mechanism 16 is provided. Each ball ramp mechanism 16 has one or multiple balls 17, which are arranged between the switching element 12 and the setting element 14 or 15. In addition adjusting ramps are formed on the switching element 12 and the setting element, which are here not further shown. The balls 17 interact with the adjusting ramps so that in a first position of the switching element 12 relative to the setting elements 14 and 15 or a first rotary angular position of the switching element 12 the setting element 14 and the setting element 15 are each in a first position. In its first position the setting element 14 is for example maximally displaced toward the switching element 12, while the setting element 15 in its first position is maximally displaced by the balls 17 away from the switching element 12.

In a second position of the switching element 12 relative to the setting elements 14 and 15 or a second rotary angular position of the switching element 12 the inverse configuration can be provided, wherein the setting elements 14 and 15 are present in their second position. As a result of a displacement or rotational movement of the switching element 12 thus a simultaneous actuation of the multidisc clutches 3 and 4 can be realized. Because the displacement of the switching element 12 is preferably accomplished electrically energy is only expensed during a gear change of the multi-speed transmission 2. The provision of support energy, for example in the form of hydraulic pressure, is also not required. Ideally the forces exerted by multidisc clutches 3 and 4 on the setting elements 14 and 15 and the torques caused by the setting elements on the switching element 12 compensate each other.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A transmission device for a motor vehicle, comprising:
a multi-speed transmission;
a multidisc clutch assigned to the multi-speed transmission for changing gears of the multi-speed transmission;
an actuating device for actuating the multidisc clutch, said actuating device having a wedge mechanism which is operatively connected with the multidisc clutch for actuating the multidisc clutch,
wherein the multi-speed transmission is constructed as an automatic transmission and having a first and a second shaft, wherein the multidisc clutch is adapted to establish a direct operative connection between the first and the second shaft of the multi-speed transmission and/or between the first shaft and a transmission housing of the multi-speed transmission;
a further multidisc clutch, said multidisc clutch and said further multidisc clutch being a component of a multi-clutch, said further multidisc clutch being actuatable with the actuating device,
wherein the further multidisc clutch is adapted to establish a direct operative connection between the first shaft and a further second shaft of the multi-speed transmission and/or between the second shaft and the transmission housing,
wherein the wedge mechanism has a displaceable switching element and a setting element operatively connected with the multidisc clutch, and wherein the switching element and/or the setting element have at least one adjusting ramp; and
a further setting element arranged on a side of the switching element opposite the setting element, said further setting element being operatively connected with the further multidisc clutch, wherein the setting element and/or the further setting element have at least one further adjusting ramp,
wherein a simultaneous actuation of the multidisc clutch and the further multidisc clutch is realized by a rotary motion of the switching element, in such a way as to execute the changing of gears of the multi-speed transmission without interruption of traction.

2. The transmission device of claim 1, wherein the multi-speed transmission is constructed as a multi-clutch transmission, and wherein the multidisc clutch is adapted to establish a direct operative connection between an input shaft and an intermediate shaft of the multi-speed transmission.

3. The transmission device of claim 2, wherein the further multidisc clutch is adapted to establish a direct operative connection between the input shaft and a further intermediate shaft of the multi-speed transmission.

4. The transmission device of claim 1, wherein the adjusting ramp and/or the further adjusting ramp are a component of a ball ramp mechanism.

5. The transmission device of claim 4, wherein the ball ramp mechanism has at least one ball which contacts the adjusting ramp or the further adjusting ramp.

* * * * *